Figure 1:
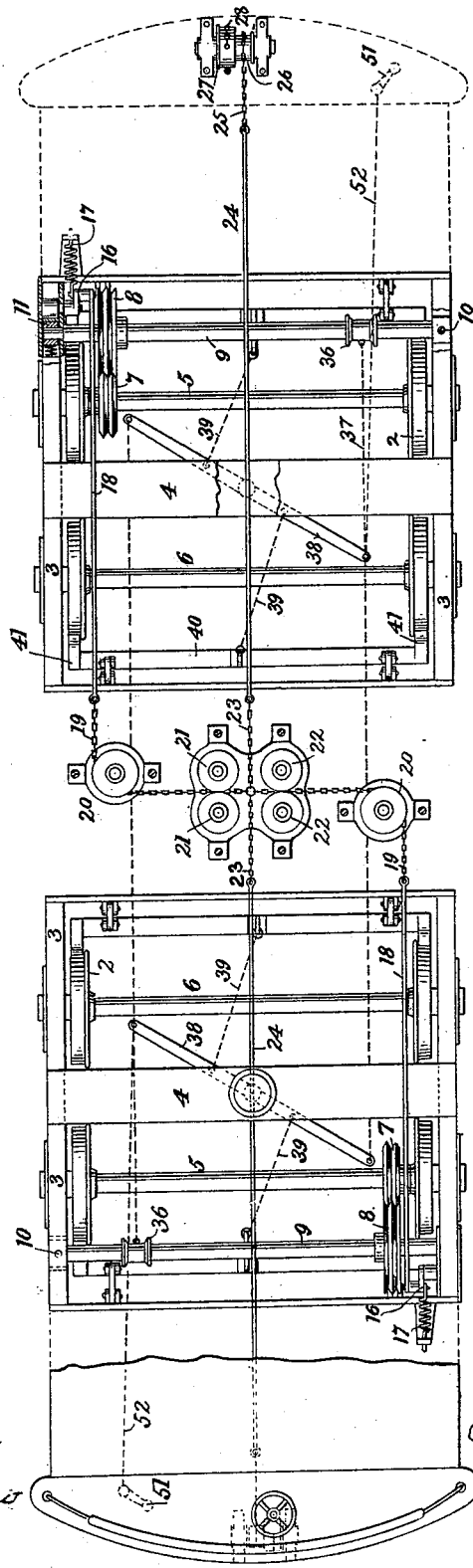

(No Model.) 2 Sheets—Sheet 1.

C. A. FOLLY.
CAR BRAKING MECHANISM.

No. 582,193. Patented May 11, 1897.

Witnesses:
Raphaël Netter
James N. Catlow

Inventor
Cornelius A. Folly.
by Robt. H. Duncan
Att'y.

(No Model.) 2 Sheets—Sheet 2.
C. A. FOLLY.
CAR BRAKING MECHANISM.
No. 582,193. Patented May 11, 1897.
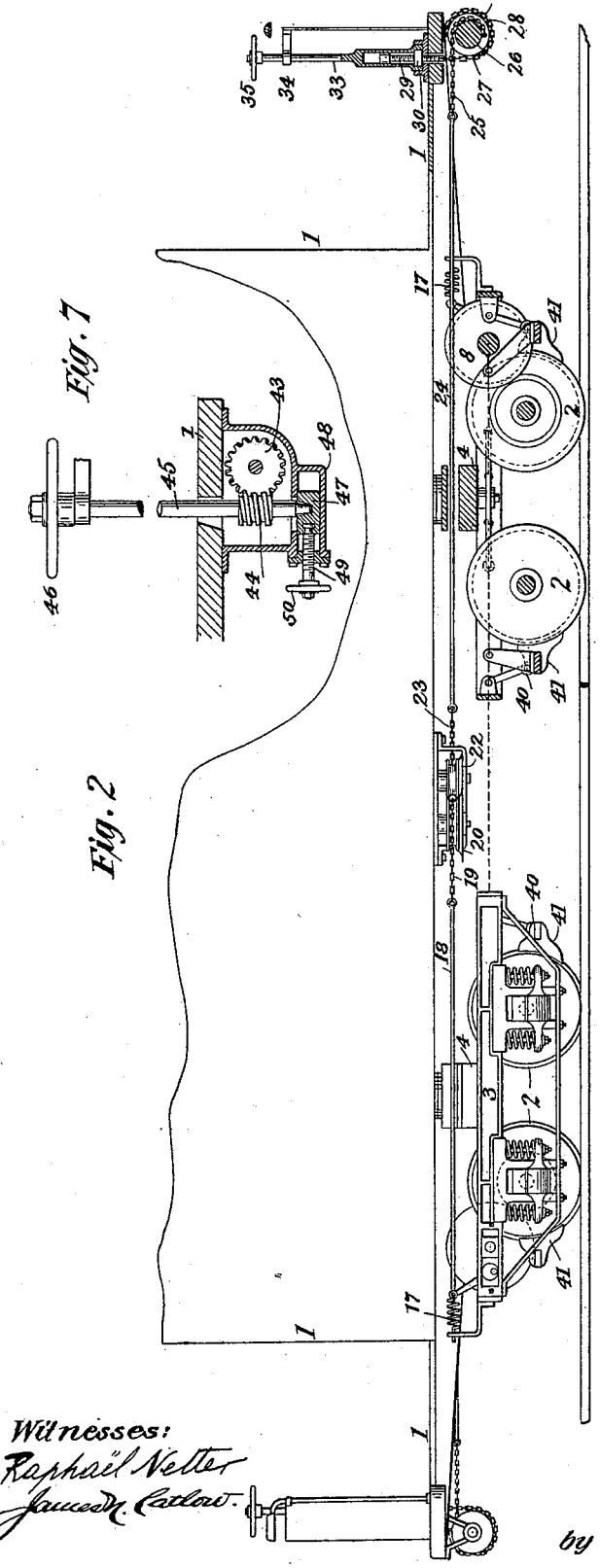
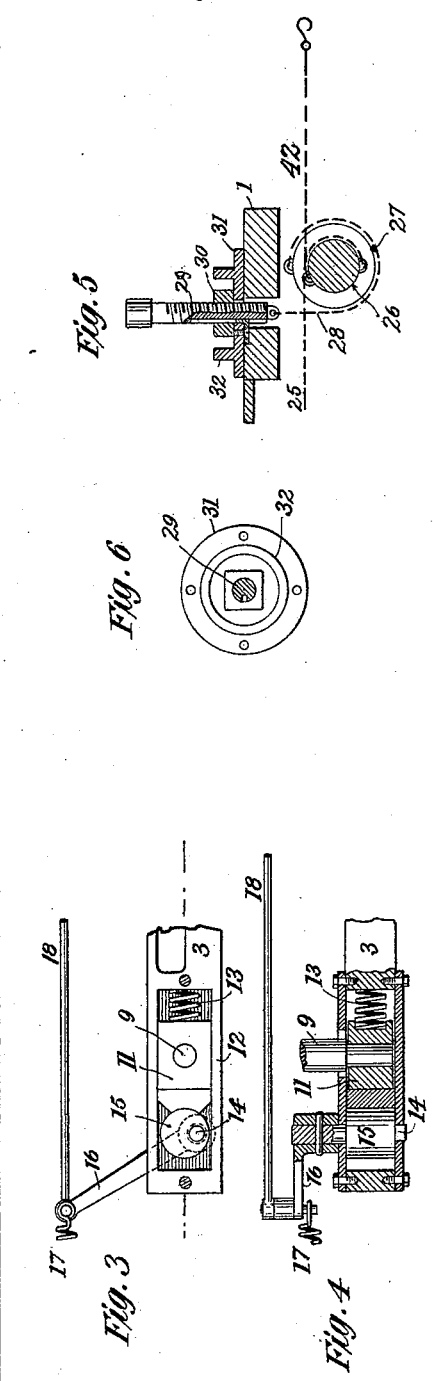
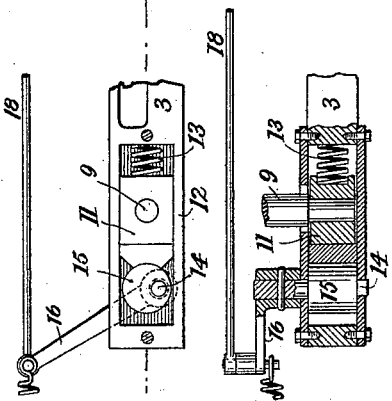
Witnesses:
Raphaël Netter
James N. Catlow
Inventor
Cornelius A. Folly
by Robt. H. Duncan Att'y

UNITED STATES PATENT OFFICE.

CORNELIUS A. FOLLY, OF RUTHERFORD, NEW JERSEY.

CAR-BRAKING MECHANISM.

SPECIFICATION forming part of Letters Patent No. 582,193, dated May 11, 1897.

Application filed May 25, 1896. Serial No. 593,042. (No model.)

*To all whom it may concern:*

Be it known that I, CORNELIUS A. FOLLY, a citizen of the United States, residing at Rutherford, county of Bergen, State of New Jersey, have invented certain new and useful Improvements in Car-Braking Mechanism, of which the following is a specification, reference being had to the accompanying drawings, forming a part of the same.

The present improvements, while they relate to braking mechanism for railway-vehicles in general, are particularly hereinafter shown and described as of form and arrangement to be applied to cable-cars, electric cars, tram-cars, &c.

One of the essential objects of this improvement is to provide a braking mechanism which shall have operation for very quick application and which, as a particular example, is arranged and designed to apply the brakes through and by means of power derived from one or more of the axles of the car.

Generally, the invention consists of hand-operated mechanism for operating the brakes, which mechanism includes means whereby supplemental power devices are brought to engagement with one or more of the axles of the car, so that the momentum of the car acting through such axle or axles is caused to operate upon and apply the brakes to the wheels of the car.

Further, the invention consists in means whereby when two cars are attached together, one being trailed or drawn from the other, the brake mechanism of the trailer can be attached to and operated through and with the brake mechanism of the leader or the drawing or propelling car.

There are also various detail improvements in construction, &c., which will hereinafter be more specifically set forth in the claims to follow this description.

Referring to the drawings, Figure 1 is a plan view of a double-truck car mechanism, the body of the car being removed. Fig. 2 is a side elevation of the same. Figs. 3 to 7 are detail views of separate parts of the brake mechanism, which will be hereinafter more particularly described and referred to.

In the views, 1 represents the body of the car and the end platforms of the same.

2 represents the wheels of the two trucks, 3 indicating the truck-beams or framework of the truck, and 4 the bolsters of the trucks.

The trucks and their framework may be of any suitable construction, as also their connecting or supporting parts with the car-body.

In lieu of two trucks of four wheels each, as shown, the car may be supported by a single long truck or by trucks of two or more axles.

5 and 6 indicate the axles of the trucks. On each of the axles 5 is mounted a grooved friction-wheel 7, which is positioned to engage with a correspondingly-shaped friction-wheel 8 on the shaft 9, which shaft at one end 10 is pivotally supported in the framework of the truck and at its other end is journaled in a block 11, running in guides or ways 12, a spring 13 being provided the tension of which normally acts to separate the two friction-wheels. Pivotally supported in the casing of these guides (and these guides are properly supported in any suitable manner on the framework of the trucks) is the crank-wrist 14, which carries fixed thereto the cam 15, located to bear against the sliding block 11, carrying the movable end of the shaft 9 of the friction-wheel 8. On this crank-wrist is the crank-arm 16, to which is attached a spring 17, the normal tension of which is to hold the arm in such position that the movable friction-wheel 8 will be out of contact with the corresponding axle friction-wheel 7.

To the arm 16 is attached the pull-rod 18, which in turn is joined by the tightly-drawn chain 19 with the corresponding draw-rod of the other truck, this chain passing reversely around the pulleys 20, which pulleys are preferably secured to the bottom of the car especially, as seen in Fig. 2. This chain 19 also passes between each pair of pulleys 21 and 22, located at the middle of the car, and between these pairs of pulleys is attached the chain 23 and draw-rod 24, the other end of which rod is by chain 25 connected to the small drum 26, pivotally carried in hanging supports at the front end or just under the buffer of the car. To this drum 26, preferably integral therewith, is secured drum 27, which carries chain 28, the other end of the same extending to and being attached to the lower end of the screw 29. This screw passes through a nut 30, resting upon the shoulder-plate 31, the shoulder 32 of which is circular and designed to receive the correspondingly circular flanged end of the hand-wheel shaft 33, which shaft extends vertically to the proper height for manipulation by the motorman or engineer of the car, being supported at its upper end by any suitable bearing, guide, or support 34, such as is usually mounted upon the dash of the car. This shaft is hollowed at its lower end in square form to engage the nut 30, and above said nut the hollow space and shaft is rounded so as to permit the screw-bolt 29 to freely turn relatively thereto. This construction, as will be seen, is such that turning the hand-wheel 35 will cause the nut 30 to traverse the screw-bolt 29 and draw upon the chain 28, thus causing the drums 27 and 26 to rotate and draw upon the chains 19, so as to effect the angular movement of the shaft 9 of the friction-wheel 8 for the purpose of bringing said wheel into contact with the friction-wheel 7 on the axle 5.

The size of the drums 26 and 27, the pitch of the thread on the bolt 29, and in fact the various sizes and arrangements of the other parts described are to be such that upon proper movement of the hand-wheel 35 the friction-wheels can be brought together at the desired rate of speed, the character of braking action as to the particular kind of car on which such mechanism is used being considered.

On the friction-wheel shaft 9 is mounted a drum 36, to which is attached a chain 37, extending to the floating lever 38, pivoted centrally to the bolster or other part of the truck-frame, which levers also have connections 39 with the brake-beams 40, carrying the brake-shoes 41, which brake-beams may be supported in any of the usual ways. It will now be seen that upon the operation of the hand-wheel of this mechanism the friction-wheels will be brought to more or less intimate contact and the angularly-movable friction-wheel will operate to draw the brakes to application, the braking power being determined by the contact of the friction-wheels. In the case of a light application being desired the friction-wheels while frictionally adhering will still have some movement relatively. In the case of the necessity of a sudden stop the hand-wheel will be operated, so that the friction-wheels will be brought into non-slipping contact, and thereupon the application of power at the shoes will be that due to the momentum or speed of the car. Of course the greater the speed of the car correspondingly greater will be the power of brake application.

On the drum 26 is attached a chain 42, arranged to draw in the same direction as the chain 25. This chain 42 is provided with a hook or other means of attachment, and it is designed that it shall be connected with the corresponding or similar chain of a trailer-car, so that the operation of the brakes from the forward car will cause the brakes of the trailer-car to be applied. To this end, and in connection with the hand-operated mechanism at the end of the car already described, it will be necessary that said hand mechanism should be released or at its open position. In other words, the screw-rod 29 should be run down to its lowest point, especially on motor and trailer car, at rear end, so that the brake mechanism of this car will be free to be operated from the leader-car.

In lieu of the hand-operated mechanism already described and particularly for the purpose last set forth the said mechanism may be modified, as shown in Fig. 7, where the drum 27, instead of being connected to the hand-operated wheel 35 by a screw and chain, is connected thereto by a gear 43 on this drum, which meshes with a worm 44 on the shaft 45 of the hand-wheel 46. This hand-wheel shaft at its upper end is supported and guided in devices adapted to act as those previously described. Its lower end, however, is pivotally supported in the slide 47, moving in framework-bearings 48, and being attached to the running screw-shaft 49, which is threaded in the said framework 48 in such manner that rotating the hand-wheel 50 of said shaft causes the lower end of the handle-wheel shaft, and correspondingly the worm 44, to move to or from the gear 43 on the said drum. In use of this mechanism and upon attaching a trailer-car to a leader the wheel 50 would be rotated a few turns, bringing the work out of union with a gear on the ground, thus leaving the drum free to be turned by its hook-and-chain connection 42 with the leader-car.

In case of a car having only four wheels practically the same mechanism would be employed, though of course the wheels and axles 6 would be absent, together with brake-bars and shoes for the same.

In the case of a car having more than two trucks or more axles than those herein shown the mechanism already described would be correspondingly added to or extended.

51 indicates the hand crank-shaft of usual construction and arrangement, to which is attached the chain 52, connected with the brake-shoe-operating lever 38, whereby the brake mechanism may be applied directly and operated by hand power and independently of the frictional mechanism, which is operated from one of the axles of the car.

What is claimed as new is—

1. In a braking mechanism, the combination with an axle bearing a grooved friction-wheel, of a shaft bearing a similar wheel and having one end mounted in a sliding box, a spring operating normally to keep the wheels separated, and an eccentric moved by suitable mechanism to actuate the box to bring the wheels into frictional contact with each other.

2. In a braking mechanism, the combination with an axle bearing a grooved friction-wheel, of a shaft bearing a similar wheel and having one end mounted in a sliding box, a spring operating normally to keep the wheels separated, an eccentric mounted to bear against the box, and connections such as rods, 18, and chains, 19, extending from one truck of the car to another truck of the same, and chain-and-rod connections extending to a hand-operated mechanism, the rod-and-chain connections being connected by suitable mechanism with the eccentric, whereby upon operating the hand mechanism the eccentric will be actuated to move the box and thereby bring the friction-wheels into operative relation with each other.

3. In a braking mechanism, the combination with the brake-shoe mechanism, of mechanism for operating the same, comprising a horizontally-disposed winding-drum, a screw-rod for actuating the winding-drum of the brake-shoe mechanism, and means for moving the rod into and out of operative position with relation to the said drum, substantially as and for the purposes hereinbefore set forth.

4. In a braking mechanism, the combination with the brake-shoe mechanism, of a brake mechanism for operating the same, comprising a rod carrying a hand-wheel and a worm, a winding-drum bearing a gear in mesh with the worm, and mechanism for throwing the worm into and out of mesh with the gear.

5. In combination with the wheels and axles of a car, and with separate brake-shoe mechanisms operating upon the same, a frictional brake-operating mechanism, a rod, 18, and chain, 19, connecting the brake-shoe mechanism and the frictional brake mechanism, grooved pulleys or other like supports, 21 and 22, disposed in a plane approximately parallel with the rod for supporting and guiding said chain, and hand operating mechanism attached to the chain, comprising a rod for actuating the winding-drum of the brake-shoe mechanism, and means whereby said rod may be rendered inoperative to actuate said brake mechanism.

6. The combination with the brake-shoe mechanism of a car and means for bringing the same into operation, comprising a rod 18, chain 19, and horizontally-disposed pulleys 21, 22, of hand-operated mechanism adapted to be connected with similar brake mechanism of an adjacent or trailer car, whereby the brake mechanism of said trailer-car can be operated from and simultaneously with the brake mechanism of the other or leading car.

CORNELIUS A. FOLLY.

Witnesses:
ROBT. F. GAYLORD,
JAMES N. CATLOW.